Aug. 24, 1943.                J. G. MOOHL                2,327,921
                METAL SAWING MACHINE STOCK FEED MECHANISM
                    Filed Feb. 5, 1942            5 Sheets-Sheet 1
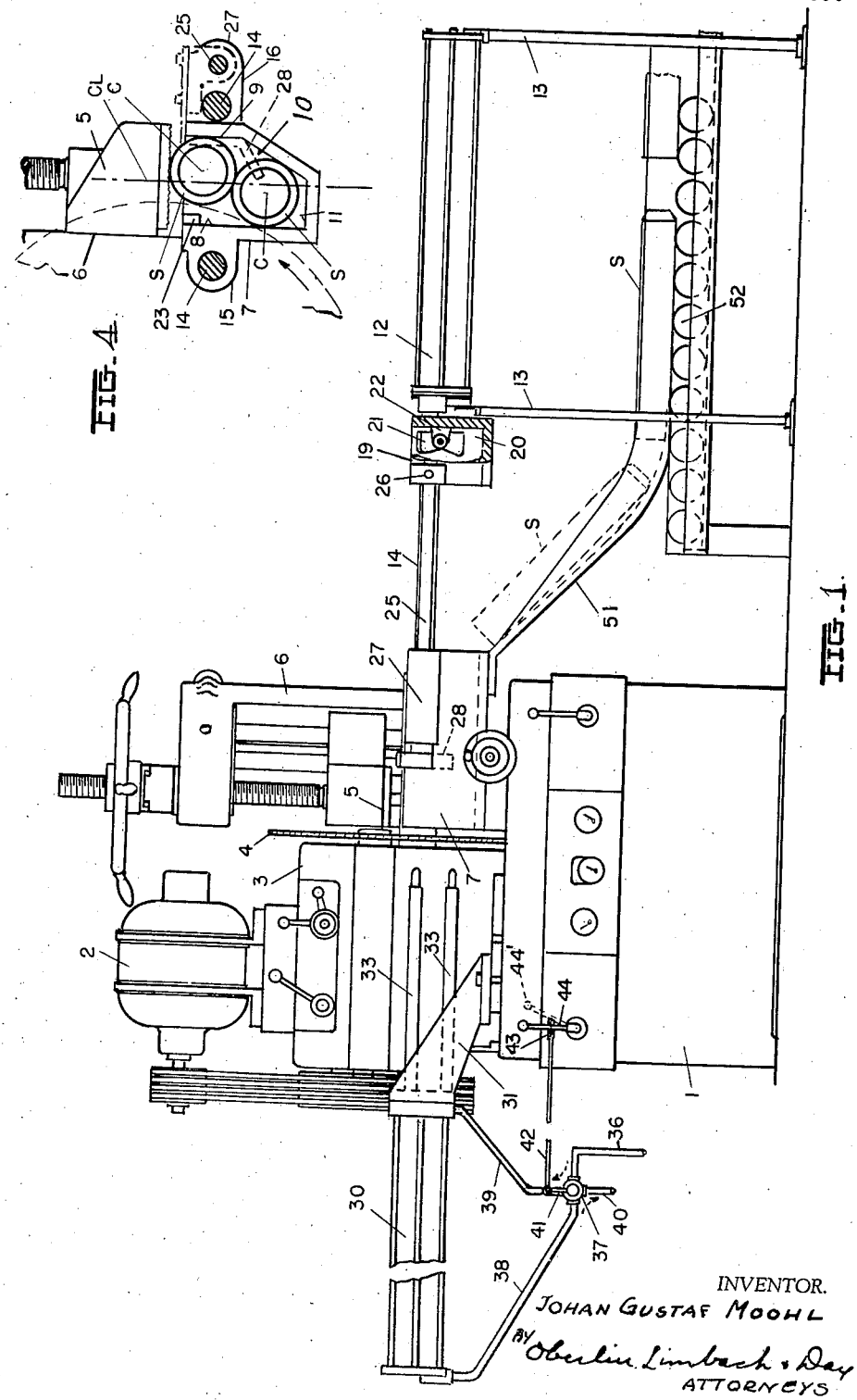
INVENTOR.
JOHAN GUSTAF MOOHL
BY Oberlin Limbach & Day
ATTORNEYS

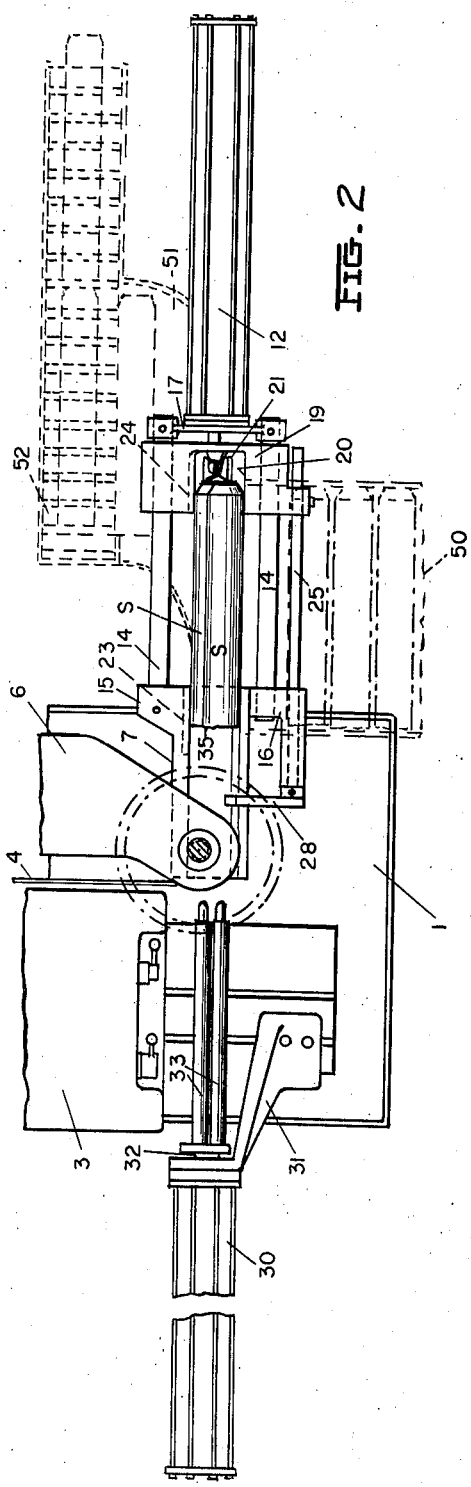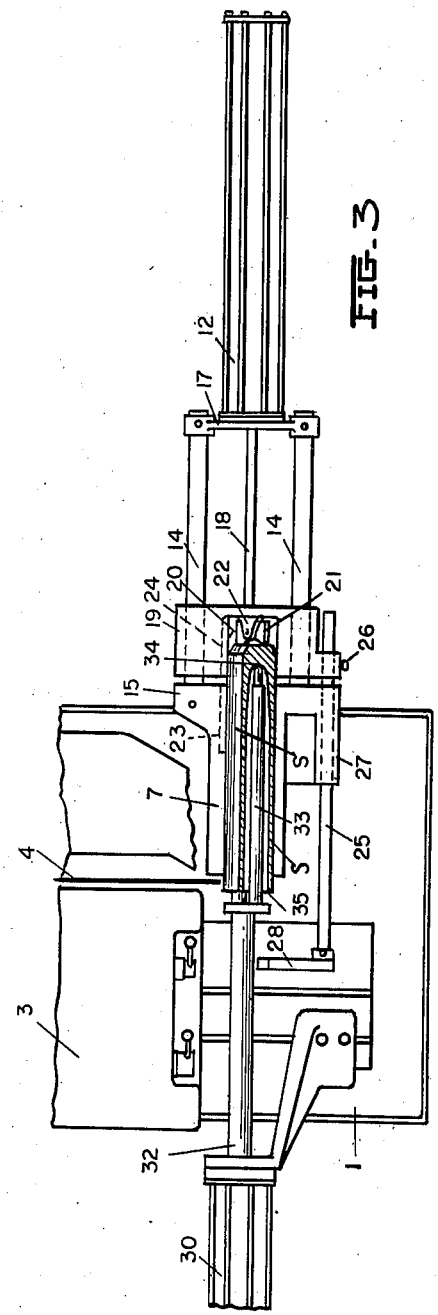

Aug. 24, 1943.    J. G. MOOHL    2,327,921
METAL SAWING MACHINE STOCK FEED MECHANISM
Filed Feb. 5, 1942    5 Sheets-Sheet 3
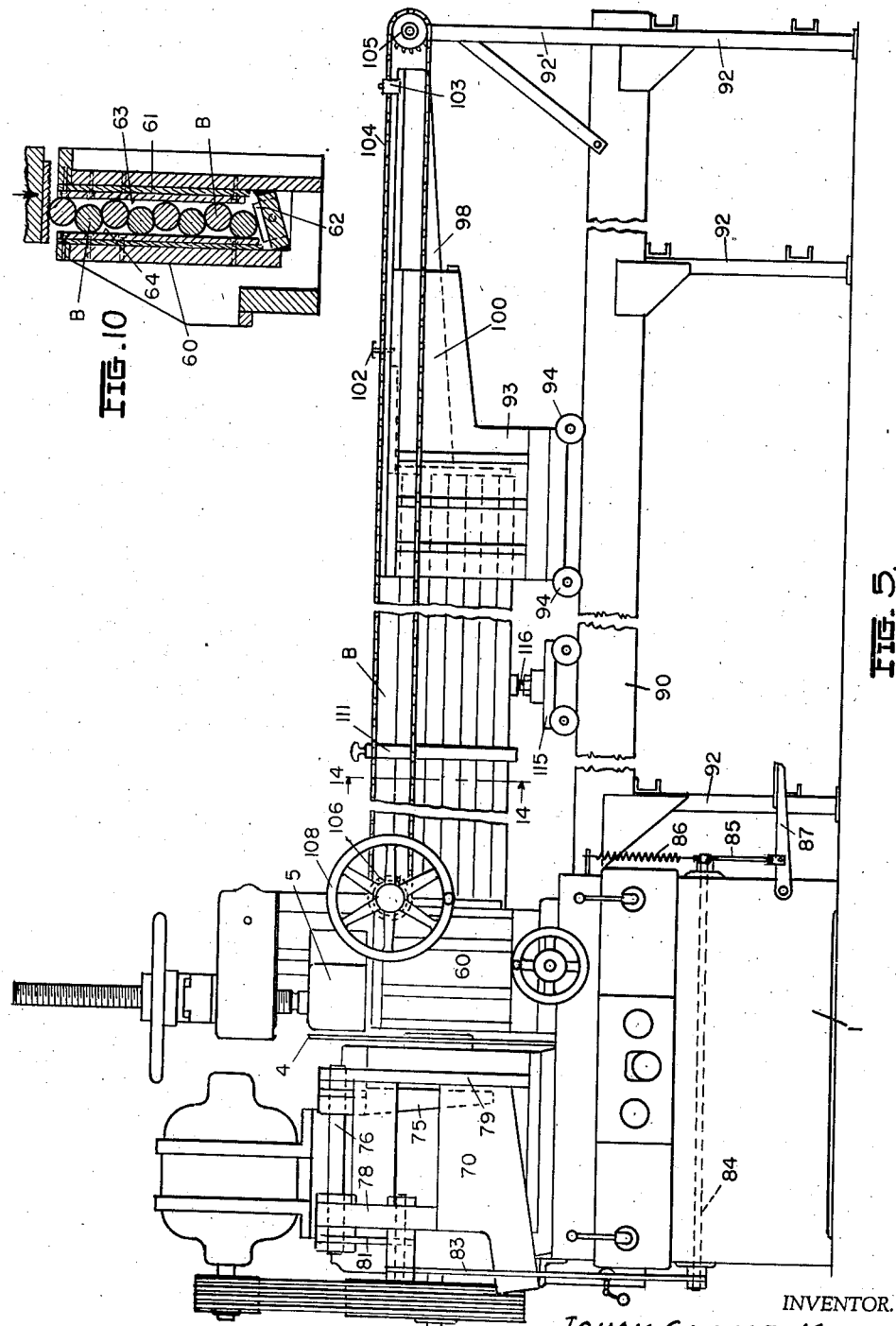
INVENTOR.
JOHAN GUSTAF MOOHL
BY
Oberlin, Limbach & Day
ATTORNEYS Aug. 24, 1943.   J. G. MOOHL   2,327,921
METAL SAWING MACHINE STOCK FEED MECHANISM
Filed Feb. 5, 1942   5 Sheets-Sheet 4

INVENTOR.
JOHAN GUSTAF MOOHL
BY Oberlin, Limbach & Day
ATTORNEYS

Aug. 24, 1943.  J. G. MOOHL  2,327,921
METAL SAWING MACHINE STOCK FEED MECHANISM
Filed Feb. 5, 1942  5 Sheets-Sheet 5
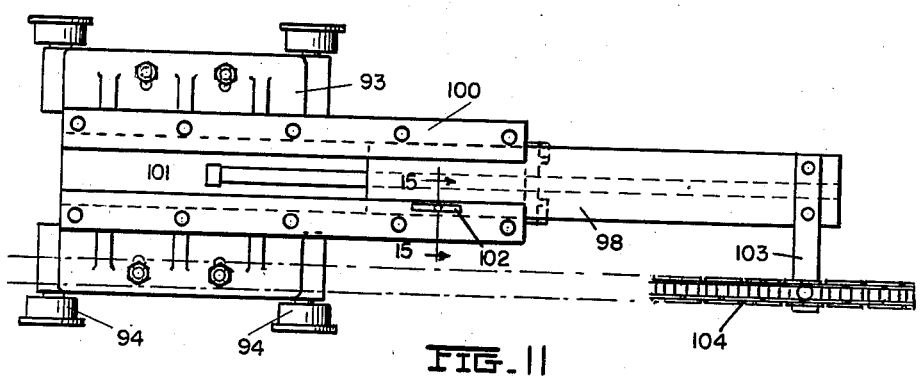
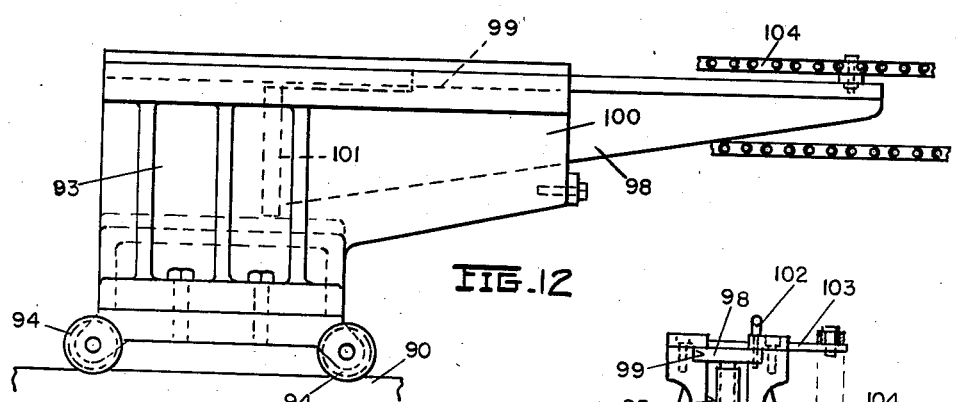
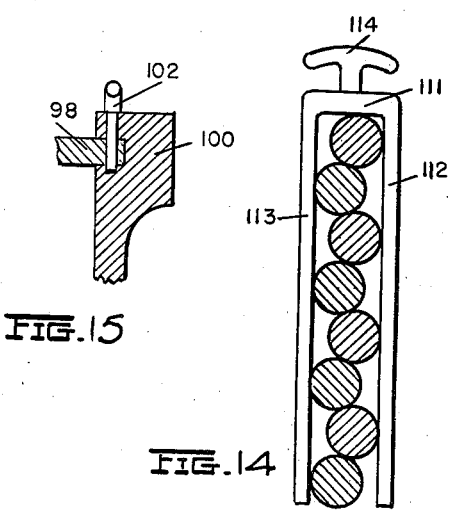
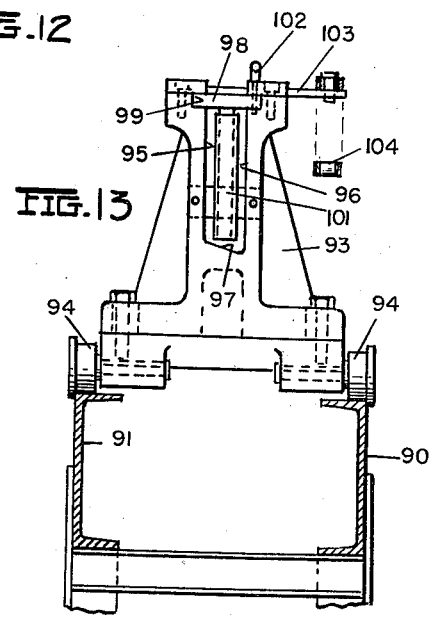
INVENTOR.
JOHAN GUSTAF MOOHL
BY Oberlin, Limbach & Day
ATTORNEYS Patented Aug. 24, 1943

2,327,921

UNITED STATES PATENT OFFICE 2,327,921

METAL SAWING MACHINE STOCK FEED MECHANISM

Johan Gustaf Moohl, Cleveland Heights, Ohio, assignor to The Motch & Merryweather Machinery Company, Cleveland, Ohio, a corporation of Ohio Application February 5, 1942, Serial No. 429,663

10 Claims. (Cl. 29—69)

The present invention, relating as indicated to a metal sawing machine stock feeding mechanism, has particular reference to a mechanism for delivering a plurality of rods, bars, tubes and generally similarly shaped elements to a position adjacent the metal saw, where they are securely held and then sawed or cut off in a single feed movement or traverse of the saw.

The general object and nature of my invention is to provide such a mechanism which is particularly adapted to grip or hold a plurality of work pieces or stock bars having a cylindrical outer surface, while the sawing operation is being performed upon them. A cylindrical element is especially difficult to hold securely against the action of a circular saw. As the teeth of a circular saw make initial contact with a cylindrical element, the action is quite analogous to that which occurs when one gear wheel meshes with another and rotative power is applied. The tendency, of course, is for the cylindrical work piece to rotate with the circular saw.

Heretofore it has been the general practice to provide a V-block form of jaw or clamping vise for holding a cylindrical element in a metal sawing machine. This has been satisfactory where only one work piece is held and cut at one time. However, when a plurality of cylindrical work pieces have been placed in a V-block form of clamping jaw, the difficulty arises in that clamping pressure cannot be applied with sufficient uniformity to each piece and hence some of the pieces will be found to be more loosely held than others, and thereby quite susceptible to being turned or loosened upon contact with the saw. Furthermore, in such a "bundle" of cylindrical elements, such as bars or tubes or the like, the majority of them are contacted merely by a convex cylindrical surface, i. e., the surface of another bar or cylindrical element, and so even if full clamping pressure were to be applied to them, there still would not be a great enough frictional gripping force to hold such elements against the superior force of the sawing action.

According to my present invention, the above difficulties have been surmounted by providing a U-shaped holding member in which a plural number of cylindrical work piece elements are assembled in longitudinally parallel relationship, with one on top of the other, and each cylindrical element being alternately disposed to opposite sides of a common center line. The cylindrical elements as so assembled thus form a sort of staggered single row, with the clamping pressure applied to the end-most elements of the row. Each one of the elements thus makes individual contact with the gripping surface of the U-shaped vise or holder, which is effective to hold each and every one of them against undesired rotation or displacement; and the cylindrical elements are so disposed with respect to each other, that increase in clamping pressure tends to increase such frictional gripping contact with the holder surfaces.

Another object of the invention is to provide means for loading or delivering a plural number of work pieces to the work holder or vise, and simultaneously to locate them at the proper distance for the desired cut-off length, prior to application of clamping pressure. Additional objects and advantages of the invention shall become apparent as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is an elevational view showing a metal sawing machine to which a mechanism embodying the principle of my invention, and particularly adapted for "cropping" or trimming the rough ends of cylindrical elements such as shell cases, has been applied;

Fig. 2 is a top plan view of the mechanism of Fig. 1;

Fig. 3 is a view similar to Fig. 2 but showing the parts in a different operative position;

Fig. 4 is a detailed view of the work piece holder taken substantially in the plane of the saw blade;

Fig. 5 is an elevational view of an alternative form of construction of the mechanism embodying the principle of my invention, and adapted to the feeding and holding of a plurality of elongated bars;

Fig. 10 is a sectional view taken substantially along line 10—10 of Fig. 6;

Fig. 11 is a plan view of the multiple work piece supporting carriage of the mechanism shown in Fig. 5;

Fig. 12 is a side elevation of Fig. 11;

Fig. 13 is an end elevation of Fig. 11;

Fig. 14 is a detailed sectional view taken substantially along line 14—14 of Fig. 5 and in the direction of the arrows; and Fig. 15 is an enlarged, detailed sectional view taken substantially along line 15—15 of Fig. 11.

Figure 6:
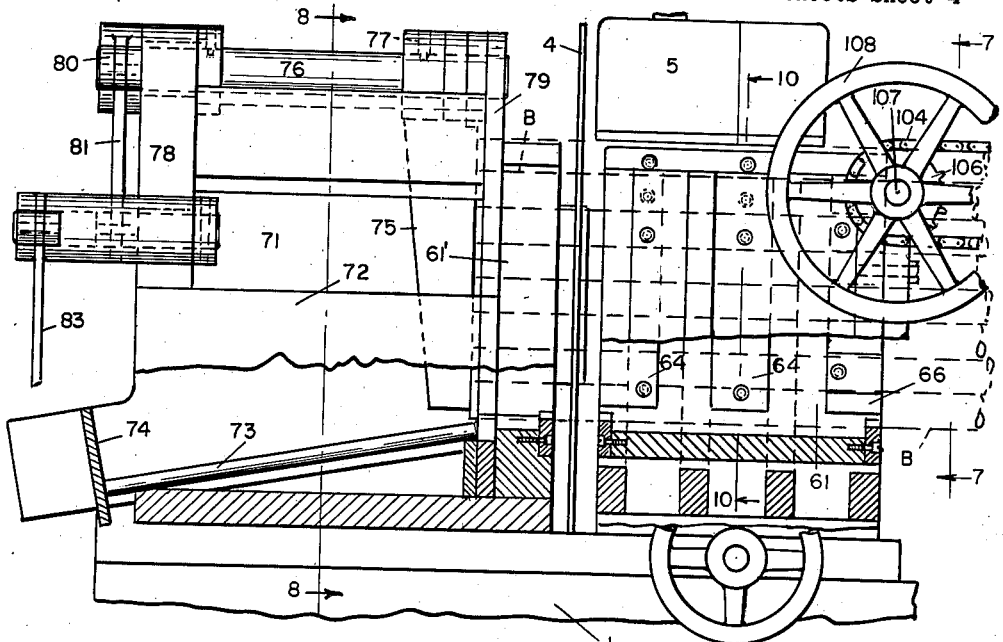
Fig. 6 is an enlarged plan view, partially in section, of the left-hand portion of Fig. 5.

Now referring particularly to Figs. 1-4 incl. of the drawings, there is shown therein a metal sawing machine comprising the base 1, the drive motor 2, the movable saw carriage 3 upon which the circular metal saw 4 is mounted. The upper, movable clamping jaw 5 is located at one side of the saw 4 and attached to the base 1 by means of the supporting column 6. The last mentioned parts of the metal saw machine, together with its operating control system are described in detail in my copending application Serial No. 404,020 filed July 25, 1941.

The mechanism for delivering, holding and discharging the work with respect to the sawing machine, which is illustrated in Figs. 1-4 incl., is particularly adapted to handle hollow cylindrical shell cases (marked S in the drawings). Thus, the lower work holding member 7 is substantially in the form of a U-shaped or channel element, which in the present instance is best shown in the Fig. 4 of the drawings, and is adapted to accommodate two shell cases S at one time. This lower work holding member comprises two opposed vertical, parallel side walls 8 and 9 which are spaced apart a distance greater than the outer diameter of one of the shell cases S but less than twice the diameter thereof, so that the axial centers C of the shell cases S are each disposed on opposite sides of the common vertical center line or plane, CL. An angularly inclined portion 10 joins the side wall 9 to the bottom wall 11 and provides an inclined plane guiding the lowermost work piece S against the opposite vertical wall 8.

A pressure cylinder 12, suitably operated by pneumatic pressure, is mounted upon the supporting frame elements 13 at the right hand side of the machine base 1 and in substantial horizontal alignment with the work holder 7. A pair of tie rods 14 extend from the lateral bosses 15 and 16 on the work holder 7 to a tie plate 17 which is also attached to the cylinder 12. The piston rod 18 from the cylinder 12 is connected to the movable support 19 which has a recess 20 therein similar in shape to the work holding recess in the work holder 7. An equalizer bar 21 is pivotally mounted at its center to the boss 22 on the end wall of the movable support 19. The outer ends of the equalizer bar 21 are adapted to contact each with one end of the work pieces S.

A projecting boss 23 is provided at the top side of the wall 8 of the work holder 7, and a similar boss 24, in horizontal alignment therewith, is provided in the side wall of the recess 20 of the support 19. The bosses 23 and 24 are of sufficient width to contact the uppermost work piece S so that the latter will be sure to be moved past the common center line CL and into contact with the opposite vertical wall 9 of the work holder 7.

A connecting rod 25 is adjustably connected to a boss on the movable support 19, such as by the set screw 26. The rod 25 also is slidably mounted in the bearing boss 27 carried by the work holder 7. An ejecting finger 28 projects laterally from the left hand end of the connecting rod 25 and is adapted to project into the interior space of the work holder 7.

A second pressure cylinder 30 is mounted on the left hand side of the machine by means of the supporting bracket 31. The piston rod 32 from the cylinder 30 carries a pair of gauge rods 33 which are disposed in longitudinal alignment with the interior of the shell cases S and are adapted to contact with the inside bases thereof, as indicated at 34. The gauge rods 33 are of such pre-determined length as to determine the desired length from the point 34 to the cut off end of the shell cases, adjacent the rough or cropped end 35 thereof.

Pressure is introduced to the cylinder 30 from the pressure supply line 36, through the four-way valve 37, which in turn is connected to the head end and the rod end of the cylinder 30 by means of the conduits 38 and 39, respectively. The valve 37 also connects to an exhaust line as indicated at 40. The stem of the valve 37 is connected by means of the arm 41 to the cross link 42 which in turn makes a lost-motion connection as indicated at 43 with the saw carriage drive control lever 44. The relationship of the last described connections between the valve 37 and the control lever 44 is such that when the lever 44 is in position to feed the saw 4 upon its forward movement, such as indicated by the dotted lines 44', the pressure is introduced through the line 39 and exhausted from the line 38, to retract the gauge rods 33. The dotted arrows in Fig. 1 adjacent the valve 37 diagrammatically illustrate such connections effected by the latter when the control lever 44 is moved to saw feeding position.

A loading or conveyor chute 50 is mounted adjacent the work holder 7 and support 19. A discharge chute 51 leads from the right hand end of the work holder 7 to the lower, unloading conveyor 52.

The operation of the above described apparatus is as follows: With the work holder 7 and support 19 in the position shown in Fig. 2, two shell cases S are delivered from the loading chute 50. Pressure is then introduced to the head end of the cylinder 30 to move the gauge rods 33 to their full right hand position as shown in Fig. 3. Next, pressure is introduced to the head end of the cylinder 12 causing the support 20 to move in a left hand direction until the ends of the gauge rods contact with the inner ends of the shell cases S, as at 34. Any irregularity in the exterior surface of the solid or right hand ends of the shell cases S is compensated for by the equalizer bar 21, thus insuring that each one of the shell cases will be moved firmly up against the ends of each of the gauge rods 33.

The upper jaw 5 is then moved down into clamping position against the top-most shell case S, holding each one of them in firm contact with each other, and against the vertical walls 8 and 9, respectively, of the holder 7. The saw feeding control lever 44 is then moved to actuating position 44', causing the gauge rods 33 to be drawn to retracted position out of the path of travel of the saw blade 4 and the latter proceeds to cut off or crop the ends 35 of the shell cases S. After the cut is made, the upper jaw 5 is raised and pressure is introduced to the rod end of the cylinder 12, causing the support 19 to move back to the position as shown in Fig. 1. During the course of this movement, the ejecting finger 28 moves into the interior of the holder 7 and contacts with the cut ends of the shell cases S, pulling the latter longitudinally back out of the holder 7. It will be noted that the distance of the finger 28 from the work holder 19 is greater than the length of the shell cases S. This permits the support 19 to move away from the holder 7 a sufficient distance so that the unsupported weight of the right hand ends of the shell cases S will tip downwardly into the chute 54 and thence to the unloading conveyor 52. The cut-off or cropped ends 35 of the shell cases S are, of course, discharged at the left hand side of the saw blade 4 immediately upon completion of the cut and before the finger 28 can come into contact therewith. The cut-off ends 35 are thus segregated from the cut or cropped work pieces.

In the alternative form of apparatus shown in Figs. 5-15, a plurality of elongated bars B (eight in number in the illustrated instance), are adapted to be simultaneously delivered, held and discharged in cut-off lengths from the sawing machine. The sawing machine in Figs. 5-15, incl. is substantially of the same basic construction as that shown in Figs. 1-4, including the base 1, the movable saw blade 4 and the upper, movable clamping jaw 5.

Figure 7:
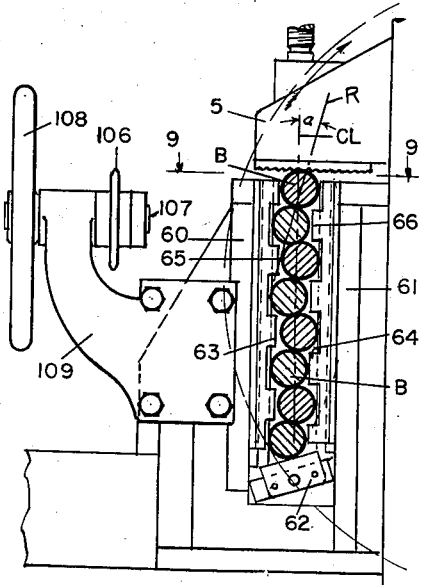
Fig. 7 is an enlarged detailed view of the work holder of the mechanism of Fig. 5 and taken substantially along the line 7—7 of Fig. 6 and in the direction of the arrows.
Figure 9:
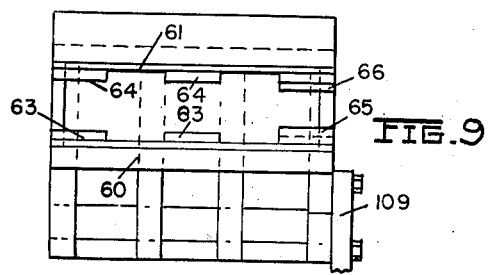
Fig. 9 is a detailed plan view looking down onto the top of the holder of Fig. 7, and substantially as indicated by line 9—9 therein.

The lower work holder consists of the fixed, spaced vertical parallel wall members 60 and 61. The bottom of the space between the wall members 60 and 61 is formed by the angularly inclined bottom plate 62. Hardened and serrated gripping strips or plates 63 and 64 are mounted upon the inner faces of the walls 60 and 61, respectively. Adjacent the right hand end of the space between the walls 60 and 61, a pair of castellated locating plates 65 and 66 are positioned. As shown in Fig. 7, the projections on the plates 65 and 66 are vertically staggered with respect to each other, thus causing alternate work bars B to tend to roll by gravity against the surface of the opposite serrated gripping plates 63 or 64 as the case might be.

Again it will be noted that the space between the contacting surfaces of the walls 60 and 61 (viz. the surfaces of the serrated plates 63 and 64) is greater than the diameter of the work bars B, but less than twice such distance. Preferably the width of this space is equal to between 1¼ and 1½ times the diameter of the bars B. As stated in another manner, the angle which the radial line R, formed by radii of adjacent work bars B passing through the point of common contact thereof, makes with the common center line CL is approximately 15°. This latter angle is denoted by the angle $a$ in Fig. 7. If the angle $a$ is too large, the bars B will have a tendency to be wedged too tightly against each other and the walls of the work holder, and if it is too small, there will not be a sufficient force component pressing the bars laterally against the surfaces of the gripping plates 63 and 64. The correct width of the space between the work-contacting surfaces of the work holder, or alternatively, the maintenance of the angle $a$ at about 15°, thus insures proper and effective transmission of clamping pressure from the upper jaw 5 to the cylindrical work pieces, and at the same time prevents them from being too tightly jammed or wedged against each other, so as to permit easy removal and longitudinal movement of the bars through the work holder, after release of pressure from the upper jaw 5.

A receiving bin or chute, indicated generally at 70, is located at the left hand side of the saw blade 4 for receiving the cut off pieces. The receiving bin comprises a back wall 71, a front wall 72 and an inclined bottom wall made up of a series of parallel bars 73. An end plate 74 may be located at the lower or left hand end of the bottom-forming bars 73 if it is desired to retain the cut-off pieces in the bin 70. Otherwise, with the omission of the plate 74, the cut-off pieces may be permitted to slide out through the left hand end of the bin 70, such as to a suitable conveyor or tote box.

In the right hand wall 79 of the receiving box 70, and immediately to the left hand side of the saw blade 4, are located guide plates 60' and 61' which are in vertical alignment with the gripping plates 63 and 64, and spaced apart the same distance. The plates 60' and 61' provide an additional guideway and holding surfaces for the left hand end of the bars B during the cut off operation.

Figure 8:
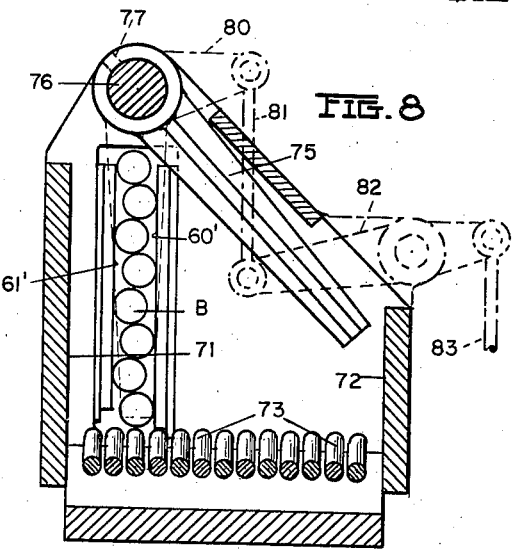
Fig. 8 is a detailed sectional view taken substantially along line 8—8 of Fig. 6 and in the direction of the arrows.

A limit stop arm 75 is mounted upon the rock shaft 76 which in turn is journaled upon bearings at the top of the left and right hand walls 78 and 79 of the receiving bin 70. The arm 75 is adjustable to desired longitudinal position upon the shaft 76, by means of the set screw 77. As will best be seen from Fig. 8, the limit stop arm 75 is adapted to swing about a point in vertical alignment with the row of bars B. A rock arm 80 connects the rock shaft 76, through the link 81 to the off-set bell crank lever 82, which is in turn connected through the link 83 to a rock arm on the cross shaft 84 and thence through another arm to the link 85 which is connected to the foot pedal 87. A tension spring 86 holds the foot pedal 87 in upper position, corresponding to the vertically inclined position of the limit stop arm 75 as shown in Fig. 8. Thus, swinging movement of the limit stop arm 75 to a vertically aligned position is effected by operation of the foot pedal 87.

An elevated track-way leads from the right hand side of the machine base 1 and is located immediately below the lower work holder. This track-way comprises a pair of spaced, parallel channel beams 90 and 91, mounted upon the vertical standards 92.

A work supporting dolly or carriage 93, mounted upon the flanged wheels 94, is adapted to travel along the beams 90 and 91. The carriage 93 has a pair of vertically spaced walls 95 and 96 and an angularly inclined bottom wall 97 which are in horizontal alignment with and present surfaces corresponding to the side and bottom walls of the lower work holder on the machine.

A pusher plate or slide 98 of T-shaped cross section is mounted in a slideway 99 extending across the top of the carriage 93. It will be noted that the upper portion of the carriage 93 projects rearwardly as indicated at 100, to provide additional slideway support for the slide 98.

The inner or left hand end of the slide 98 has an abutment plate 101 which is adapted to contact with the ends of each of the work bars B.

A locking pin 102 extends through aligned holes on the top flange of the slide 98 and in the carriage portion 100, for holding the slide against movement with respect to the carriage.

A laterally projecting arm 103 connects the right hand outer end of the slide 98 to the endless chain 104 which travels around the chain sprockets 105 and 106. The sprocket 105 is carried upon the upper extension 92' of the trackway standard 92. The sprocket 106 is mounted upon the shaft 107 which is turned by the hand wheel 108. The shaft 107 is supported by and journaled in the bracket 109 mounted upon the lower work holder.

A U-shaped retaining clip 111 is adapted to be slipped over the intermediate portion of the work bars B between the lower work holder and the carriage 93, to prevent such bars from bending of their own weight and sagging out of properly aligned position. The arms 112 and 113 of the retaining clip 111 are spaced apart from each other slightly less than the width of the space between the gripping plates 63 and 64 of the work holder. The purpose of having the space between the arms 112 and 113 of a slightly less width than between the gripping plates 63 and 64 is to aid in the longitudinal feed movement of the bars B when clamping pressure is released upon them. In other words, the retaining clip 111 holds the bars B in a position closer to the common center plane CL, than when in their clamped position in the work holder. This has the result of tending to move the bars out of contact with the gripping plates 63 and 64 when clamping pressure from the vise jaw 5 is released, thereby reducing frictional engagement of the bars with such gripping plates when longitudinal feed movement occurs.

A lifting handle 114 is provided on the top of the retaining clip 111 so that the latter might be conveniently removed during operation merely by lifting it upwardly, and at such time when the uncut length of the bars B is such that there is no longer any tendency to sag or bend down out of place.

Where unusually long pieces of stock are employed in the machine, an auxiliary supporting dolly 115 may be employed. The dolly 115 is also mounted upon flanged wheels and has a screw jack 116 adapted to contact with the lowermost of the bars B.

The operation of the apparatus of Figs. 5-15 is as follows:—The series of work bars B are placed in the lower work holder and in the supporting carriage 93, substantially as shown in Fig. 5. The hand wheel 108 is then turned and the foot pedal 87 depressed until the bars are positioned up against the limit stop arm 75, determining the desired length to be cut off. Foot pedal 87 is released and the upper jaw 5 is then moved downwardly to hold all of the bars securely and the movable saw blade 4 is then actuated to effect the cut through them. The saw 4 is then moved back to retracted position and the upper jaw 5 raised, removing clamping pressure upon the series of bars B. The hand wheel 108 is then turned, pushing the cut off pieces past the left hand end of the guide walls 60' and 61', permitting them to fall down to the bottom of the bin 70. Upon again depressing the foot pedal 87, the limit stop arm 75 swings back to vertical position, determining the length for another batch of pieces to be cut off and a repeat cycle of operations.

As the uncut length of the bars B becomes sufficiently short so that they will not sag in the middle due to their own weight, the retaining clip 111 and the dolly 115 are removed. When the carriage 93 moves up against the machine base 1, the locking pin 102 is removed, and then by further turning of the hand wheel and movement of the chain 104, the slide 98 will operate to push the outer ends of the bars B into the work holder so that there will be a minimum amount of uncut stock left.

Other modes of applying the principle of the invention may be employed, change being made as regards the details described, provided the features stated in any of the following claims or the equivalent of such be employed.

I therefore particularly point out and distinctly claim as my invention:

1. In a metal sawing machine the combination of a movable circular saw, stock feeding mechanism for holding a plurality of cylindrical work pieces in the path of travel of said saw comprising a holding member having parallel, opposed vertical walls forming a space adapted to receive said work pieces in an axially parallel position and vertically superimposed one upon the other, the width of said space being such that alternate work pieces contact one only of said opposed walls and a horizontally inclined surface located at the bottom of said space, said inclined surface extending from one of said vertical walls and being adapted to be contacted with the bottommost of said work pieces whereby the latter is caused to roll against the other of said vertical walls.

2. In a metal sawing machine the combination of a movable circular saw, stock feeding mechanism for holding a plurality of cylindrical work pieces in the path of travel of said saw comprising a holding member having parallel, opposed vertical walls forming a space adapted to receive said work pieces in an axially parallel position and vertically superimposed one upon the other, the width of said space being such that alternate work pieces contact one only of said opposed walls and a horizontally inclined surface located at the bottom of said space, said inclined surface extending from one of said vertical walls and being adapted to be contacted with the bottommost of said work pieces whereby the latter is caused to roll against the other of said vertical walls and a clamping member movable toward and away from the top side of said opposed walls and adapted to contact the topmost of said work pieces.

3. In a machine for sawing hollow cylindrical elements such as shell cases and the like, the combination of a movable circular saw, a work piece holder located at one side of said saw, power means for moving said cylindrical elements longitudinally into said holder, movable gauge means located at the other side of said saw and adapted to project into the interior of said cylindrical elements, and work piece ejecting means normally located at the other side of said saw, said ejecting means being connected to said power means and movable in unison therewith, the distance between the points of contact of said ejecting means and of said power means, respectively, with said cylindrical elements being greater than the uncut length of said cylindrical elements.

4. In a machine for sawing hollow cylindrical elements such as shell cases and the like, the combination of a movable circular saw, a channel-shaped work piece holder adapted to receive a plurality of said cylindrical elements in longitudinally parallel and vertically superimposed relationship, said holder being located at one side of said saw, pressure actuated means for pushing said cylindrical elements longitudinally into said holder, a plurality of pressure actuated, longitudinally movable gauge rod on the other side of said saw, each of said rods being disposed in axial alignment with each of said cylindrical elements, and a work piece ejector carried by said pushing means, said ejector being adapted to contact the opposite ends of said cylindrical elements to that contacted by said pushing means, the distance between the said ejector and said pushing means being greater than the uncut length of said cylindrical elements.

5. In a machine for sawing hollow cylindrical elements such as shell cases and the like, the combination of a movable circular saw, a channel-shaped work piece holder adapted to receive a plurality of said cylindrical elements in longitudinally parallel and vertically superimposed relationship, said holder being located at one side of said saw, a channel-shaped reciprocable support positioned outwardly of said holder and in horizontal alignment therewith for receiving the outer ends of said cylindrical elements, a pressure cylinder having a piston connected to said support, a plurality of pressure actuated, longitudinally movable gauge rods on the other side of said saw, each of said rods being disposed in axial alignment with each of said cylindrical elements, an ejector bar carried by said support and being spaced therefrom to contact the opposite ends of said cylindrical elements, and means for adjusting the distance between said ejector bar and said support.

6. In a machine for sawing hollow cylindrical elements such as shell cases and the like, the combination of a movable circular saw, a channel-shaped work piece holder adapted to receive a plurality of said cylindrical elements in longitudinally parallel and vertically superimposed relationship, said holder being located at one side of said saw, a channel-shaped reciprocable support positioned outwardly of said holder and in horizontal alignment therewith for receiving the outer ends of said cylindrical elements, a pressure cylinder having a piston connected to said support, and abutment means in said support for contacting said outer ends comprising a centrally pivoted bar having end projections in alignment with the said outer ends of two of said cylindrical elements.

7. In a machine for sawing hollow cylindrical elements such as shell cases and the like, the combination of a movable circular saw, a work piece holder located at one side of said saw, power means for moving said cylindrical elements longitudinally into said holder, movable gauge means located at the other side of said saw and movable in a direction parallel to that of said holder whereby said gauge means are adapted to project into the interior of said cylindrical elements, power means for moving said gauge means, a control element for actuating the feed movement of said saw, and connecting means between said control element and said last named power means for actuating the latter to retracted position of said gauge means when said control element is moved to saw feeding position.

8. In a metal sawing machine, the combination of a movable circular saw, stock feeding mechanism for delivering and holding a plurality of elongated bars in the path of travel of said saw comprising a holder having parallel spaced walls located at one side of said saw, a movable carriage located outwardly of said machine and in horizontal alignment with said holder, said carriage also having parallel spaced walls for receiving the outer ends of said bars, a slide carried by and longitudinally movable on said carriage, an abutment on one end of said slide extending into the space between said last-named walls and adapted to contact the ends of said bars, the other end of said slide projecting outwardly of said carriage, and drive mechanism connected to said other end of said slide for moving said slide and said carriage toward said machine.

9. In a metal sawing machine, the combination of a movable circular saw, stock feeding mechanism for delivering and holding a plurality of elongated bars in the path of travel of said saw comprising a holder having parallel spaced walls located at one side of said saw, a movable carriage located outwardly of said machine and in horizontal alignment with said holder, said carriage also having parallel spaced walls for receiving the outer ends of said bars, a slide longitudinally movable of said carriage, an abutment on one end of said slide extending into the space between said last-named walls and adapted to contact the ends of said bars, the other end of said slide projecting outwardly of said carriage, and drive mechanism connected to said other end of said slide for moving said slide and said carriage toward said machine, and means for locking said slide against movement with respect to said carriage.

10. In a metal sawing machine, the combination of a movable circular saw, stock feeding mechanism for delivering and holding a plurality of elongated bars in the path of travel of said saw comprising a holder having parallel spaced walls located at one side of said saw, a movable carriage located outwardly of said machine and in horizontal alignment with said holder, said carriage also having parallel spaced walls for receiving the outer ends of said bars, and a removable U-shaped retaining clip having its arms spaced slightly less than the distance between said walls, said clip being adapted to engage said bars at a point mid-way of said holder and said carriage.

JOHAN GUSTAF MOOHL.